(12) United States Patent
Silverfox

(10) Patent No.: US 6,941,628 B1
(45) Date of Patent: Sep. 13, 2005

(54) BEAD-FORMING TOOL

(76) Inventor: Josephine Ann Silverfox, 3370 N. Hayden Rd., #123-230, Scottsdale, AZ (US) 85251

( * ) Notice: Subject to any disclaimer, the term of this patent is extended or adjusted under 35 U.S.C. 154(b) by 166 days.

(21) Appl. No.: 10/160,475

(22) Filed: May 30, 2002

Related U.S. Application Data

(60) Provisional application No. 60/294,883, filed on May 31, 2001.

(51) Int. Cl.[7] .............................................. B23P 19/04
(52) U.S. Cl. .............................. 29/267; 29/270; 29/10; 29/896.4; 81/300; 81/424.5; 81/427; 72/409.01; 140/121
(58) Field of Search ............................ 29/9, 10, 896.4, 29/267, 270, 283.5, 896.42; 81/3, 6, 300, 421, 424.5, 427, 426, 426.5; 72/409.01; 63/4, 38, 39; 140/121, 106

(56) References Cited

U.S. PATENT DOCUMENTS

| | | | | |
|---|---|---|---|---|
| 2,753,741 | A | * | 7/1956 | Riley ....................... 72/409.13 |
| 3,261,238 | A | * | 7/1966 | Amerling ......................... 81/7 |
| 3,879,981 | A | * | 4/1975 | Richards ................... 72/409.01 |
| 4,219,919 | A | * | 9/1980 | Fischbein et al. ............. 29/270 |
| 4,318,316 | A | * | 3/1982 | Guilliams .................. 81/426.5 |
| 4,403,497 | A | * | 9/1983 | Matteucci ................ 72/409.16 |
| 4,796,318 | A | * | 1/1989 | Bigej ............................ 7/106 |
| D356,520 | S | | 3/1995 | Bartky |
| 5,426,843 | A | | 6/1995 | Bartky |
| 5,855,048 | A | * | 1/1999 | Synowicki et al. ............ 29/10 |

OTHER PUBLICATIONS

The Ganoksin Project Small Bench Tools Description, 10 pages Copyright (c) Charles Lewton–Brain 1992.*

* cited by examiner

*Primary Examiner*—David P. Bryant
*Assistant Examiner*—Jermie E. Cozart
(74) *Attorney, Agent, or Firm*—Parsons & Goltry; Michael W. Goltry; Robert A. Parsons

(57) ABSTRACT

The invention comprises tools for forming beads on one or more filaments using a malleable material for the bead. The tools exert bead-forming forces radially inward toward the filament and axially along the filament toward the center of the bead. The tools comprise pliers with jaws which meet flush with each other over at least a portion of the jaw face. Aligned cavities are formed in each jaw face wherein each cavity's dimension across the jaw face is less than the width of the jaw face. Grooves, aligned generally transverse to the width of the jaw face provide a filament-receiving channel between the cavity and the edge of the jaw face. Malleable material encompassing the filament is aligned between the aligned cavities and the jaws are closed. The radial force of the cavity walls on the malleable material deforms the malleable material radially and the walls of the cavity exert a force axially to form a bead. Tools with cavities having textures embossed, engraved, or otherwise patterned in relief on the cavity walls may be employed to impress a texture or design on a formed bead. Multiple filaments may be crimped together with this invention.

7 Claims, 3 Drawing Sheets

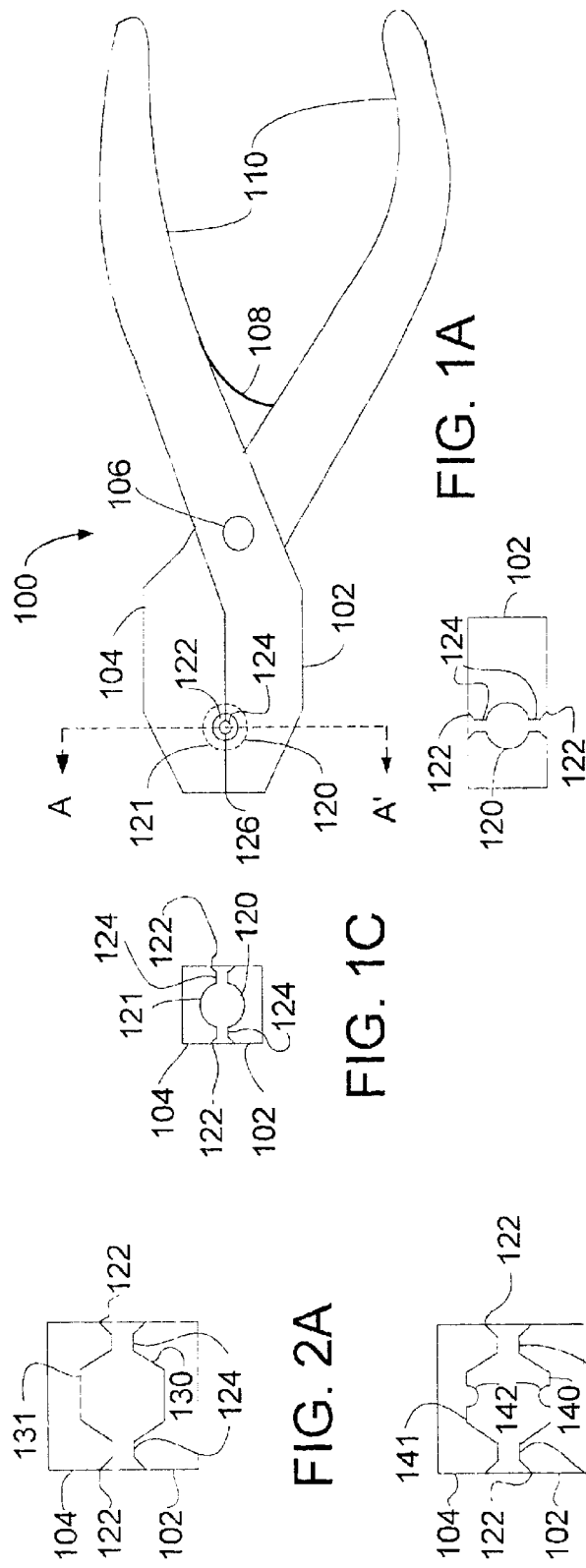

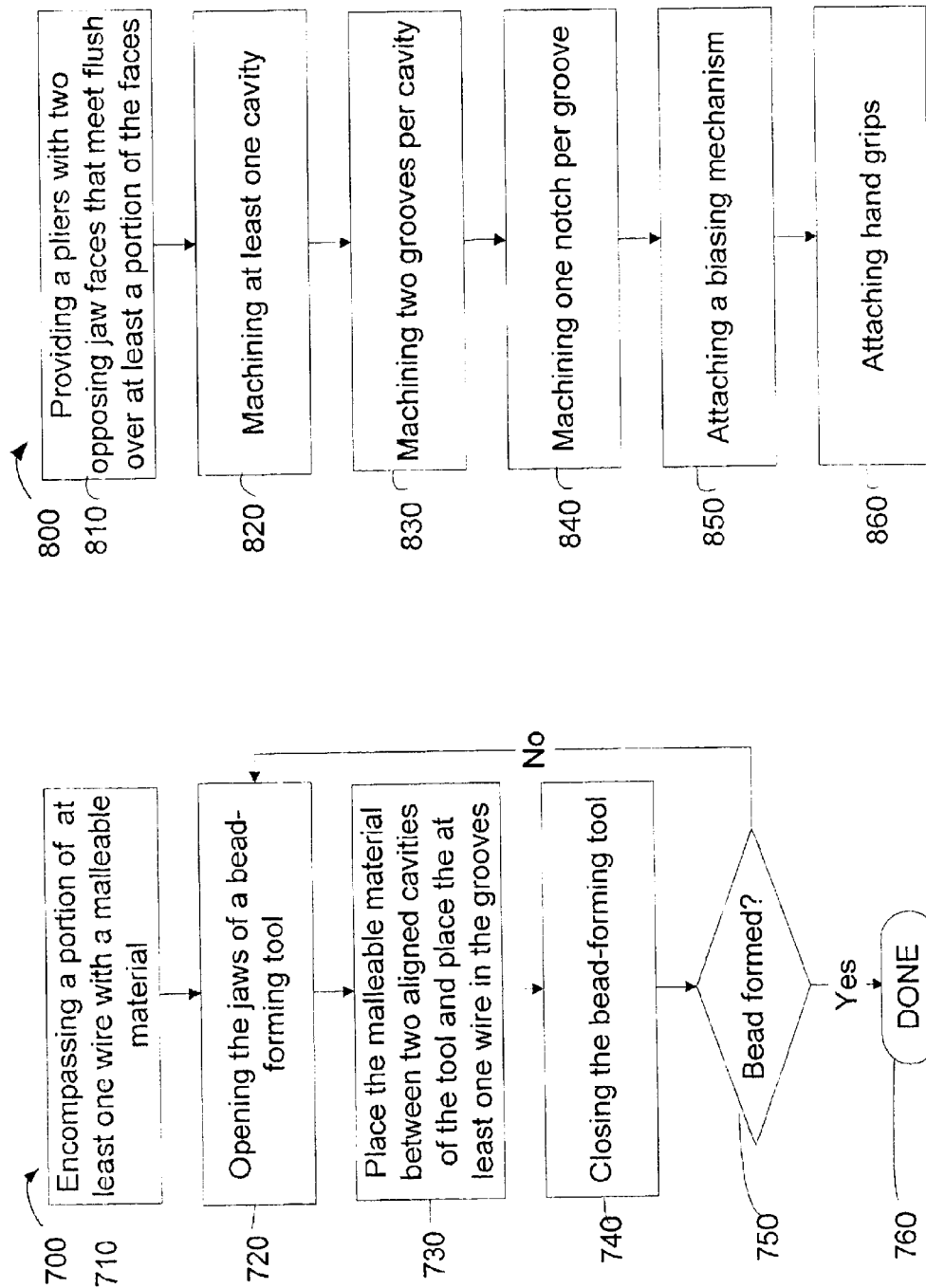

BEAD-FORMING TOOL

This application claims the priority of U.S. Provisional Patent Application 60/294,883 filed May 31, 2001.

BACKGROUND OF THE INVENTION

1. Technical Field

This invention generally relates to tools for jewelry making and more specifically to tools for crimping wires together. The invention also relates to forming decorative or functional beads onto one or more wires for any purpose.

2. Background

Decorative beads are strung on cords or wires of various types to form products such as jewelry, fishing lures, and artwork. Once the beads are strung for jewelry making the end of the cord or wire is looped around an end piece, usually a portion of a jewelry fastener, and the cord or wire is crimped together using a crimping bead and a crimping tool. An example of such a crimping tool and method may be found in U.S. Pat. No. 5,426,843 to Bartky (Jun. 27, 1995). Bartky discloses a tool for radial compression of a ferrule onto wires using a two-step method. Bartky's tool has crimping dies that provide only radial compression. Consequently, Bartky's tool controls only the shape of the radial cross-section of the bead.

Beads used in making fishing lures conventional fit loosely on the shaft of a fish hook and are secured by bent wire or the curvature of the hook itself. Beads are used in artwork, including artwork for static display, such as wall hangings. Beads used for crimping may also have a purely functional purpose: joining two filaments.

Crimping tools currently available in the market produce functional but unattractive crimped beads. The beads are generally cylindrical, by virtue of being only radially compressed, and are shaped conformally to the wires. The crimped bead often appeals in stark contrast to the beauty of the beadwork it secures. Furthermore, current methods of crimping beads require repositioning the bead to a second crimping die in the tool. An additional disadvantage of some tools currently on the market is that it is available for only one size of wire. For example, a commercially available tool, used with a 0.014 inch diameter wire, does not crimp the wires tightly enough to prevent the wire from pulling loose. Many jewelry makers hold currently available devices in low regard because of difficulty of use.

Accordingly, there is a need for a tool that provides an axial as well as a radial bead-forming force. In addition, a bead-forming tool that is not limited to crimping wires together is also desired. For example, a tool for forming a bead fixedly on a single rigid wire, such as the shaft of a fish-hook, is desired. Furthermore, a tool that can provide various textures for beads is desired.

SUMMARY OF THE INVENTION

The invention comprises tools for forming beads on one or more filaments using a malleable material for the bead. The tools exert bead-forming forces radially inward toward the filament and axially along the filament toward the center of the bead. The tools comprise pliers with jaws which meet flush with each other over at least a portion of the jaw face. Aligned cavities are formed in each jaw face wherein each cavity's dimension across the jaw face is less than the width of the jaw face. Grooves, aligned generally transverse to the width of the jaw face provide a filament-receiving channel between the cavity and the edge of the jaw face. Malleable material encompassing the filament is aligned between the aligned cavities and the jaws are closed. The radial force of the cavity walls on the malleable material deforms the malleable material radially and the walls of the cavity exert a force axially to form a bead. Tools with cavities having textures embossed, engraved, or otherwise patterned in relief on the cavity walls may be employed to impress a texture or design on a formed bead. Multiple filaments may be crimped together with this invention.

The foregoing and other features and advantages of the present invention will be apparent from the following more detailed description of the particular embodiments of the invention, as illustrated in the accompanying drawings.

BRIEF DESCRIPTION OF THE DRAWINGS

FIG. 1A shows an exemplary tool according to an embodiment of the present invention with a section line A–A' defined;

FIG. 1B shows a plan view of an exemplary jaw face of the exemplary tool according to an embodiment of the present invention;

FIG. 1C shows a vertical section view A–A' of an exemplary bead-forming cavity of the exemplary tool according to an embodiment of the present invention;

FIG. 2A shows an alternate embodiment of a vertical section view A–A' of an exemplary bead-forming cavity configured according to an embodiment of the present invention;

FIG. 2B shows another alternate embodiment of a vertical section view A–A' of an exemplary bead-forming cavity configured according to an embodiment of the present invention;

FIG. 3A shows comparative alternate approaches to forming grooves in the jaw face according to an embodiment of the present invention;

FIG. 3B shows alternate bead-forming cavity shapes in the jaw face according to an embodiment of the present invention;

FIG. 3C shows a bead-forming cavity in the jaw face and an associated texturing cavity according to an embodiment of the present invention;

FIG. 3D shows an irregular bead-forming cavity in the jaw face and an associated texturing cavity according to an embodiment of the present invention;

FIG. 7 shows an exemplary process of making beads with the apparatus of FIG.

FIG. 8 shows an exemplary process of making the apparatus of FIG. 1.

DETAILED DESCRIPTION OF EMBODIMENTS OF THE INVENTION

Figure 5A:
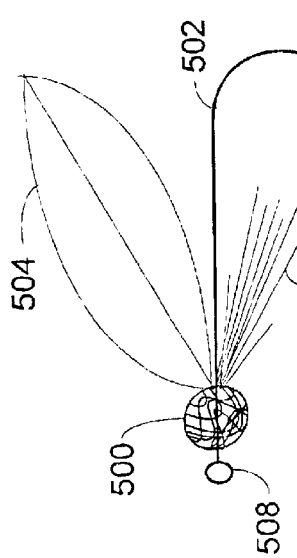
FIG. 5A shows an exemplary fishing lure made by the bead forming and texturing methods of an embodiment of the present invention.

As discussed above, embodiments of the present invention relate to forming beads fixedly on at least one filament.

"Filament" as used and defined herein refers to any flexible or rigid, pliant or resilient, regularly or irregularly elongated shape of material. For example, and without limitation, metallic wire (single or stranded), cord, string, yarn, thread, hair, fur, feather shafts, plastic monofilaments, bone, wood or other plant material, bristle, rawhide, leather, and seaweed, may all be filaments. "Wire" is used synonymously with "filament," herein.

FIG. 1A shows an example of an embodiment of a bead-forming tool 100. The tool comprises jaws 102 and 104 which extend to handles 110. The jaws pivot about pivot 106 by the manipulation of handles 110 or the action of biasing mechanism 108, which biases the jaws apart. The jaws 102 and 104 have faces which meet flush to form seam 126. The jaw faces comprise aligned cavities 120 and 121 which meet to form a bead-forming cavity when the jaws 102 and 104 are closed, as shown. Cavities 120 and 121 are shown as broken lines to indicate they are hidden from exterior view. A groove 124 for receiving a wire upon which the bead may be formed extends from the cavity to the edge of the jaw face. An portion of the groove 124 may expand radially outward to form a wire-engaging notch 122, which is used in initially aligning the wire between the cavities 120 and 121. FIG. 1A defines a section view A–A'.

The jaws 102 and 104, pivot 106, and handles 110 together show a pair of pliers. Any of the various configurations of pliers, including, for example, locking pliers, adjustable pliers, and channel-lock pliers, are adaptable to the present invention. The adaptation requires jaws 102 and 104 with faces that meet flush and have aligned cavities and grooves in the faces. In particular embodiments, the pliers 102, 104, 106, and 110 further comprise hand grips. The band grips are high-friction coverings for the handles that make manipulating the tool easier.

The cavities 120 and 121 exert both radial and axial forces on the malleable material when jaws 102 and 104 close. The radial forces are exerted inward toward the at least one wire. The axial forces are exerted as the malleable material, deformed by the radial forces, presses against the walls of cavities 120 and 121. The axial forces are exerted inwardly and roughly parallel to the at least one wire. The combination of axial and radial forces enables formation of fully shaped beads.

FIG. 1B shows a plan view of the face of exemplary jaw 102. Cavity 120 is a hemispherical cavity 120 in the exemplary embodiment of FIGS. 1A–C. Grooves 124 lie generally transverse across face of jaw 102 on an axis aligned to the center of the cavity 120. Notches 122 for the grooves 122 are shown as conical notches 122.

FIG. 1C shows a view of an exemplary section A–A'. Notches 122, grooves 124, and cavities 120 and 121 in jaws 102 and 104, respectively, align when the jaws 102 and 104 are closed, as shown.

FIG. 2A shows an enlarged view through exemplary section A–A' of an exemplary alternate embodiment of bead-forming cavities 130–131. Cavities 130–131 form a cylindrical bead with tapered ends. Those of ordinary skill in the art will understand from FIG. 2A that bead-forming cavities 130–131 of various sizes and shapes may be formed for decorative or functional purposes.

FIG. 2B shows an enlarged view through exemplary section A–A' of another exemplary alternate embodiment of bead-forming cavities 140–141. Cavities 140–141 have a circumferential protrusion 142 which may form a reciprocal indentation in the bead for decorative or other purposes. For example, it may be desired to tie a cord around the finished bead, and the indentation may assist keeping that cord in place. Those of ordinary skill in the art will understand from FIG. 2B that various arrangements of circumferential protrusions 142 of various sizes and shapes may be formed to produce beads for decorative or functional purposes. Likewise, those of ordinary skill in the art will understand from FIG. 2B that circumferential indentations in the cavity wall (not shown) may used to the same effect as circumferential protrusion 142.

FIG. 3A shows an exemplary jaw 104 face with three exemplary bead-forming cavities 302, 304, and 306 using alternate groove 324, 326, and 328 shapes. Groove 324 comprises a straight semi-cylindrical groove with no notch 122 portion. Groove 326 is all notch 122 portion. Groove 328 and notch 322 show smooth rounded junctures between the cavity 306 and groove 328, and also between the groove 328 and the notch 322. Those of ordinary skill in the art will understand from FIG. 3A and the discussion above the range of possibilities between having no notch 324 and having the entire groove become a notch 326.

FIG. 3B shows two exemplary alternate cavity shapes 308 and 310 that are, like cavities 120–121, 130–131, 140–141, 302, 304, and 306, radially symmetrical about the filament, or wire. FIG. 3B is not exhaustive as to possible shapes. For example, other shapes may include bi-cone (joined at base 308 or apex), ellipsoid, pyramid, cube, cuboid, prism, tetrahedron, octahedron, dodecahedron, icosahedron, a bilaterally symmetrical shape, or a shape expressible as two generally convex portions joined at coextensive bases. Those of ordinary skill in the art will understand from FIG. 3B that cavities need not be symmetrical about the long axis of the jaw 104.

FIG. 3C shows an exemplary bead-forming cavity 312 and an associated exemplary bead-texturing cavity 314 on the same jaw 104 face. For texturing which is not uniformly circumferential (as with cavities 140–141) the bead must be formed first and then, after formation, textured with a single closing of the jaws 102–104. Bead-forming with the bead-forming tool normally takes several jaw closings to accomplish. Once the bead is formed, it is placed between the texturing cavities 314 and the jaws are again closed. The bead-texturing cavity 314 has a pattern 315 embossed, engraved, or otherwise in patterned in relief on or in the cavity surface. When a formed bead of malleable material is placed in the cavity 314 and the jaws 102 and 104 are closed, the pattern 315 in relief is impressed upon the bead. The bead-texturing cavity 314 should have the same volume as or slightly less volume than the associated bead-forming cavity 312.

FIG. 3D shows an exemplary bead-forming cavity 316 and an associated exemplary bead-texturing cavity 318 on the same jaw 104 face. Cavity 316 is not symmetrical about the axis of the filament, but is symmetrical about the meeting plane 126 (FIG. 1A) of the jaw 104 face. Bead-texturing cavity 318 is shown embossed with the pattern in relief 317 of a minnow's head for use with a fishing lure. Those of ordinary skill in the art will understand from FIG. 3D that beads need not be radially or axially symmetrical. The pliers 102, 104, 106, and 110 used with cavities 316 and 318 are generally required to exert more force on the malleable material than for beads that are radially symmetrical about the filament. Radially symmetrical beads can be formed by a sequence of jaw closings at different angles around the filament axis. The bi-symmetrical beads can only be formed from one angle unless multiple bead-forming cavities are used. Alternatively, a softer malleable material may be used for beads with little or no radial symmetry. Those of ordinary skill in the art will further understand from FIG. 3D that beads need not be even bi-symmetrical. On the other aligned cavity from the minnow head cavities 316 and 318 (on jaw 102) there may be an insect head, for example, on jaw 104.

Figure 4:
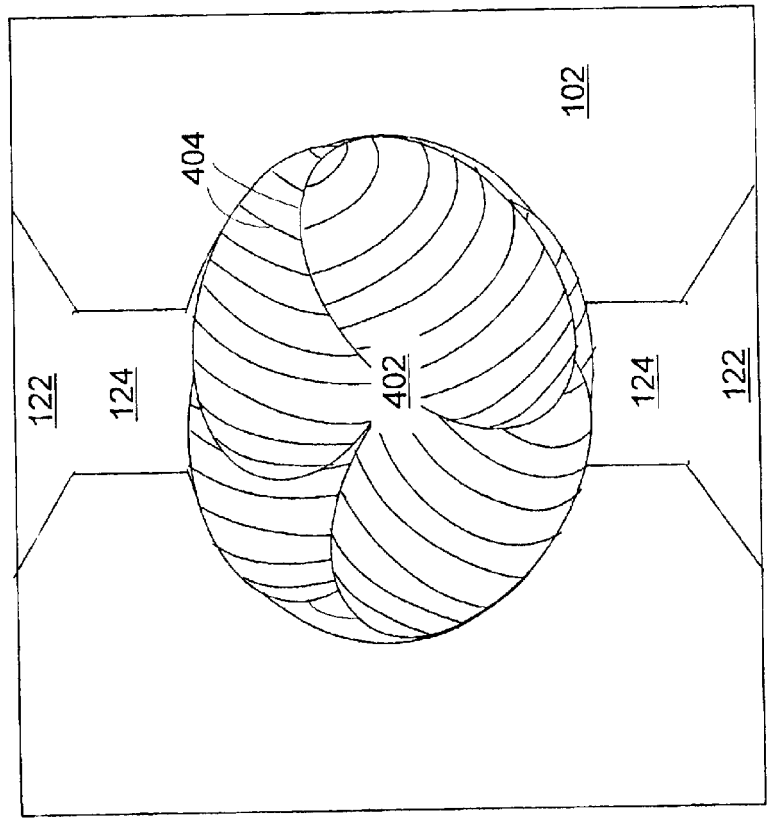
FIG. 4 shows an exemplary bead-texturing cavity in a jaw face of an embodiment of the present invention.

FIG. 4 shows an enlarged view of a portion exemplary jaw 102 face having a textured cavity 402, grooves 124 and notches 122. The texture 404 may be formed by embossing, engraving, etching, or similar means known in the art for creating a pattern in relief on a surface. Alternatively, the jaw 102 may be cast, rather than machined, and the texture may be a feature of the mold in which the jaw 102 is cast. The only limits on textures 404 are the material properties of the malleable material, the requirement that the material not be forced into a cavity portion from which it cannot release, and the ingenuity of the designer. For example, for jewelry making, a plurality of minute facets or combinations of larger and smaller facets may be appropriate. For further example, for fishing lures, the texture of an insect's exoskeleton or earthworm's skin may be appropriate.

FIG. 5A shows an exemplary fishing lure comprising textured bead 500, formed with an embodiment of the tool of the present invention, wherein the bead 500 crimps together the shaft of fish hook 502, a portion of the shaft of feather 504, and a plurality of bristles 506. Those of ordinary skill in the art will understand from FIG. 5A a wide range of applications of the present invention to making fishing lures. For example, a fishing lure may be constructed of a series of textured beads along a fish hook, each bead having the texture and shape of a portion of the exoskeleton of a segmented insect, and each bead crimping a plurality of short bristles to the shaft of the fish hook. In an alternate embodiment of the tool 100 (FIG. 1), the grooves 124 are adapted to receive the curved portion of the fish hook, so that even the curve of the hook may receive beads.

Figure 5B:
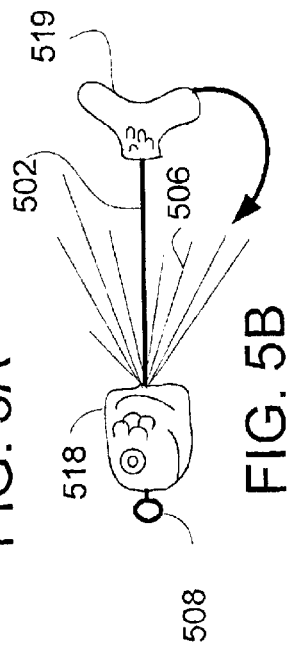
FIG. 5B shows another exemplary fishing lure made by the bead forming and texturing methods of an embodiment of the present invention.

FIG. 5B shows another exemplary fishing lure comprising textured beads 518 and 519, formed with an embodiment of the tool of the present invention, wherein the bead 518 crimps together the shaft of fish hook 502 and a plurality of bristles 506. The bead has the texture of cavity 318. Bead 519 is formed on a curved rigid wire. In an embodiment, the bead-forming tool comprises at least two larger cavities with different orientations. For example, a first larger cavity comprises an appropriately shaped cavity with grooves curved to receive the curved wire from inside the bend of the curve and a second larger cavity for the same bead is configured to receive the partially formed bead and the wire from outside the bend of the curve. Those of ordinary skill in the art will understand from FIG. 5B and the description above that the bead-forming apparatuses of the present invention are not limited to forming radially symmetrical beads and further understand that the bead-forming tools of the present invention can be adapted to curved rigid wires other than fish hooks.

Figure 6:
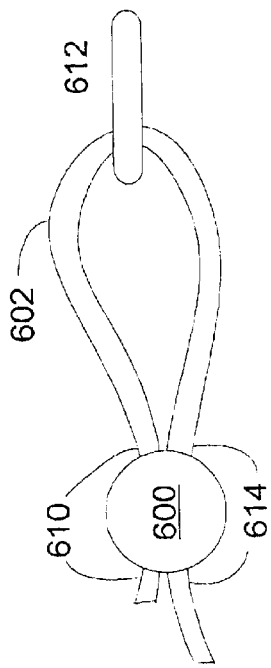
FIG. 6 shows an exemplary jewelry bead formed by an exemplary method of an embodiment of the present invention.

FIG. 6 shows an exemplary bead 600 crimping a portion 610 of a jewelry wire 602 to portion 614 of that same jewelry wire 602, after it has been looped through a portion of jewelry fastener 612. The bead 600 is shown as spherical, but may be of any shape, textured or not textured. Those of ordinary skill in the art will understand from FIG. 6 and the description above the wide range of possibilities for finishing strings of beads used for making jewelry. For example, bracelets and necklaces made of beads can be finished, or crimped, using a bead that is shaped and textured appropriately for the beads strung on the bracelet or necklace. Likewise, those of ordinary skill in the art will appreciate that crimping is not limited to an even number of strands of jewelry wire 602 nor is it limited to two strands. Embodiments of the present invention can be made to crimp together many strands, the limit on the number depending on the diameter of the strands, the malleability of the malleable material, and the force that can applied with the particular bead-forming tool.

Kits comprising a plurality of bead-forming tools 100 (FIG. 1) are contemplated by the invention. Kits specifically formed for making jewelry, fishing lures, artwork, or other special purposes may be formed.

FIG. 7 shows an exemplary embodiment of a process 700 for a use for an embodiment of a bead-forming tool. The first step 710 involves encompassing a portion of at least one wire with a malleable material. The malleable material may be silver, gold, alloys and composites thereof, commercially available crimping beads as used in the jewelry-making trade, or any other malleable material with good wear characteristics. In addition to crimping beads, which slide over the end of the wire to be crimped, the malleable material may be initially in the form of a wire, a strip, or a similar form which can be wrapped around the at least one wire in preparation for bead formation. Wrapping obviates the need for having access to the end of the at least one wire before forming a bead thereon. This can be particularly useful in repairing jewelry where existing crimping beads are failing. In an embodiment for children, the malleable material may be Play-Doh™ and the at least one wire may be string or yarn. The at least one wire may be any strand of any durable material sufficiently small in diameter to receive a bead. The bead-forming tool of the present invention may be made in a variety of sizes and adapted to a variety of wire and bead sizes.

As a general consideration, for beads that are relied on against dynamic forces, as in a bracelet, the malleable material should be as close in hardness to the hardness of the wire as is practically possible. Otherwise, the harder material will deform the softer until structural failure occurs in the softer material. For example, gold beads used on yarn inevitably cut through the yarn if subjected to the forces incident to motion. A combination of hard and soft material may be appropriate for artwork for static display. At the end of step 710, a portion of the at least one wire is encompassed by a volume of malleable material sufficient to form a bead.

In step 720, the jaws of the bead-forming tool 100 (FIG. 1) are opened, providing access to the bead-forming cavities on the faces of the jaws. For embodiments with a biasing mechanism attached, the bead-forming tool may be opened by relaxing the hand holding the handles of the bead-forming tool.

In step 730, the malleable material encompassing a portion of the at least one wire is placed in a bead-forming cavity and the wire is guided into the grooves associated with that cavity. In an alternate embodiment, portions of malleable material are placed in each aligned cavity, and at least one bare wire is laid in the grooves and through the cavities.

In step 740, the jaws of the bead-forming tool are closed, forcing the malleable material into the shape of the bead-forming cavity. Closing the bead-forming tool also forces the malleable material into spaces between wires when multiple wires are involved. As a result, the wires are held fixedly in relation to one another.

In step 750, the jaws of the bead-forming tool are opened and progress is inspected. In forming radially symmetric beads, it is normal to close the jaws several times to complete formation. Each closure is performed at an angular offset from the previous closure, the angle being about the axis of the at least one wire. Asymmetric beads, beads on curved rigid wires, and beads being patterned with non-circumferentially symmetric textures must be made without a change in angle. In some embodiments multiple cavities may be used to get the best symmetric approximation to the asymmetric bead possible, so that the final asymmetric bead-forming step requires as little additional deformation of the malleable material as possible. If the bead is not formed on the first try, additional closings of the jaws, with repositioning of the malleable material and wire, as appropriate, are required. The process goes back to step 720 and repeats until the bead is formed.

FIG. 8 shows an exemplary method 800 of manufacturing an embodiment of a bead-forming tool by machining. Step 810 begins with a pair of pliers with opposing jaw faces that meet flush when the pliers are closed. In an alternate embodiment of the method 800, the manufacturing of the pliers is part of the process.

Step 820 involves machining at least one cavity in each jaw face, with the cavities on opposite faces aligned to form a single cavity when the jaws are closed. Machining may comprise drilling, grinding, cutting, chiseling or polishing. Cutting and drilling may be mechanical or by laser. If the cavity is patterned in relief for texturing, laser cutting or micro-machining may be required.

Step 830 involves machining the grooves between each cavity and the nearest edge of the jaw. In most embodiments, the grooves will be perpendicular to the jaw edge. This allows the bead-forming tool to be as narrow as possible for working in small spaces. In a particular embodiment, the grooves are not perpendicular. Obviously, at least a portion of the grooves on one jaw face must align with a portion of the grooves on the opposing jaw face.

Step 840 produces notches, or widened portions, at the end of each groove. The notches make it easier to engage the wire, as in step 730 (FIG. 7), with the grooves. The user can slide the wire along the edge of the jaw until it catches easily in the notch, then press the engaged wire into the groove. In some embodiments, there are no notches.

Step 850 adds a biasing mechanism to bias the jaws open. The biasing mechanism is typically a spring. The spring may be a reed spring 108 (FIG. 1A), a coil spring, or a torsional spring associated with the pivot 106 (FIG. 1A). Those of ordinary skill in the art of spring biasing will know of additional approaches to spring bias pliers. In some embodiments, no spring biasing mechanism is used.

Step 860 adds hand grips to the handles of the bead-forming tool. The grips may slip on or added by dipping the handles into a liquid synthetic rubber compound and letting it dry. Other means of adding handle grips are known to those of ordinary skill in the art as well. In some embodiments, no handle grips are used. In a few embodiments, handle grips are achieved by texturing the handles themselves.

The embodiments and examples set forth herein were presented in order to best explain the present invention and its practical application and to thereby enable those of ordinary skill in the art to make and use the invention. However, those of ordinary skill in the art will recognize that the foregoing description and examples have been presented for the purposes of illustration and example only. The description as set forth is not intended to be exhaustive or to limit the invention to the precise form disclosed. Many modifications and variations are possible in light of the teachings above without departing from the spirit and scope of the forthcoming claims. For example, using beads to connect two filaments, irrespective of decorative or other functional use. For further example, using beads for decoration of single filaments, irrespective of any crimping, as on eyeglass stems, drapery pulls, or fringe on clothing.

I claim:

1. An apparatus for creating at least one bead on at least one wire, the apparatus comprising:

pliers comprising two opposing jaws, each jaw having a face, wherein the faces of the jaws meet flush over at least a portion of the jaw faces when the pliers are closed, the jaws further comprising a width, the width comprising the shortest dimension across the face of the jaw;

at least one cavity in the flush-meeting portion of the face of each jaw, the at least one cavity having a width less than a width of the face containing the at least one cavity, the at least one cavity in the flush-meeting portion of the face of each jaw forming at least one larger cavity when the pliers are closed, the at least one larger cavity having the shape and size of a bead to be formed; and two grooves for the at least one cavity in each face of each jaw, each groove extending from a point on the at least one cavity to an edge of the jaw, the grooves in opposing jaws aligned to form a channel when the jaws are closed, the channel sized to receive the at least one wire.

2. The apparatus of claim 1, further comprising notches in the face of each jaw, each notch comprising a portion of a groove bounded by the edge of the jaw, the notch widening from the end of the notch nearest the cavity towards the end bounded by the edge of the jaw.

3. The apparatus of claim 1, further comprising a biasing mechanism, the biasing mechanism configured to bias the pliers open.

4. The apparatus of claim 1, wherein the grooves for a given cavity are shaped and positioned to receive a shaped rigid wire.

5. The apparatus of claim 1, wherein the shape of the at least one larger cavity comprises a cone, bi-cone, ellipsoid, pyramid, cube, cuboid, prism, tetrahedron, octahedron, dodecahedron, icosahedron, a bilaterally symmetrical shape, or a shape expressible as two generally convex portions joined at coextensive bases.

6. The apparatus of claim 1, further comprising a pattern in relief on at least a portion of the surface of a cavity, the pattern in relief operative to transfer the pattern to a bead within the cavity when the pliers are closed.

7. The apparatus of claim 6, wherein the pattern in relief represents a texture of at least one of an animal, a plant, and a faceted gemstone.

* * * * *